(12) United States Patent
Shiokawa et al.

(10) Patent No.: US 10,016,925 B2
(45) Date of Patent: Jul. 10, 2018

(54) BLOW MOLDING DEVICE

(71) Applicant: DISCMA AG, Zürich (CH)

(72) Inventors: Mitsuru Shiokawa, Kanagawa (JP); Yuichi Okuyama, Kanagawa (JP)

(73) Assignee: DISCMA AG, Zürich (CH)

( * ) Notice: Subject to any disclaimer, the term of this patent is extended or adjusted under 35 U.S.C. 154(b) by 0 days.

(21) Appl. No.: 15/500,606

(22) PCT Filed: Jul. 28, 2015

(86) PCT No.: PCT/JP2015/003781
§ 371 (c)(1),
(2) Date: Jan. 31, 2017

(87) PCT Pub. No.: WO2016/017151
PCT Pub. Date: Feb. 4, 2016

(65) Prior Publication Data
US 2017/0217076 A1   Aug. 3, 2017

(30) Foreign Application Priority Data
Jul. 31, 2014   (JP) .................. 2014-156904

(51) Int. Cl.
*B29C 49/42* (2006.01)
*B29C 49/46* (2006.01)
*B65B 3/02* (2006.01)
*B29C 49/28* (2006.01)
*B67C 3/02* (2006.01)
*B29K 23/00* (2006.01)
*B29K 67/00* (2006.01)
*B29K 105/00* (2006.01)
*B29L 31/00* (2006.01)

(52) U.S. Cl.
CPC .......... *B29C 49/4273* (2013.01); *B29C 49/28* (2013.01); *B29C 49/46* (2013.01); *B67C 3/02* (2013.01); *B29K 2023/12* (2013.01); *B29K 2067/003* (2013.01); *B29K 2105/258* (2013.01); *B29L 2031/7158* (2013.01)

(58) Field of Classification Search
CPC ......... B65B 7/2835; B65B 3/02; B65B 3/022; B29C 49/46; B29C 49/4273
See application file for complete search history.

(56) References Cited

FOREIGN PATENT DOCUMENTS

| JP | H11-292049 A | 10/1999 |
|----|----|----|
| JP | 2011-527244 A | 10/2011 |
| JP | 2011-246185 A | 12/2011 |
| WO | 2013/020884 A1 | 2/2013 |
| WO | 2013/117492 A1 | 8/2013 |

*Primary Examiner* — Robert B Davis
(74) *Attorney, Agent, or Firm* — Eric J. Sosenko; Jonathan P. O'Brien; Honigman Miller Schwartz and Cohn LLP

(57) ABSTRACT

A blow molding device with a mold into which preform is mounted and a blow nozzle that connects to a mouth tube section of the preform. The blow molding device feeds pressurized liquid from the blow nozzle into the preform and includes a blow nozzle displacement unit that raises and lowers the blow nozzle along the axis of the preform. The blow nozzle has a cap attaching unit that fixes and holds a cap, for sealing a bottle, to a mouth tube section of the bottle when the blow nozzle is lowered by operation of the blow nozzle displacement unit.

11 Claims, 6 Drawing Sheets

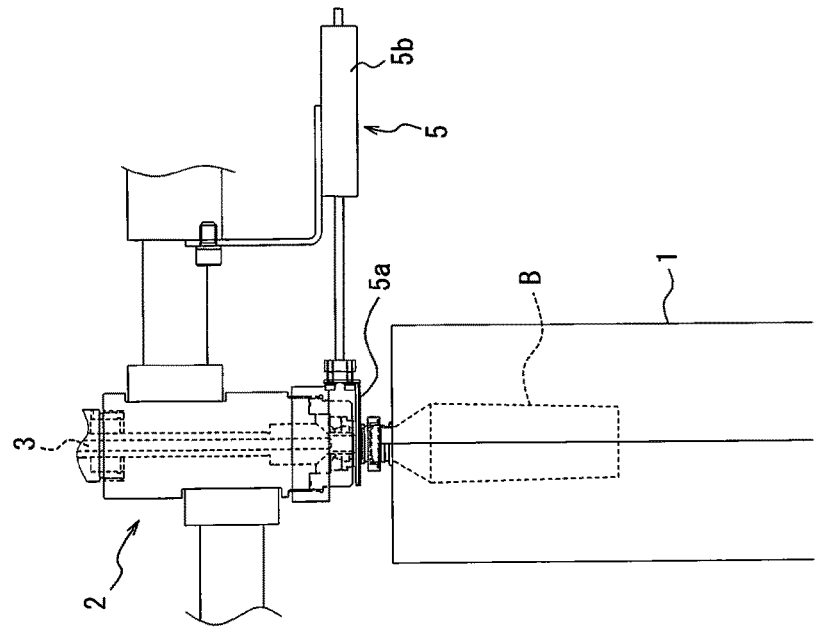
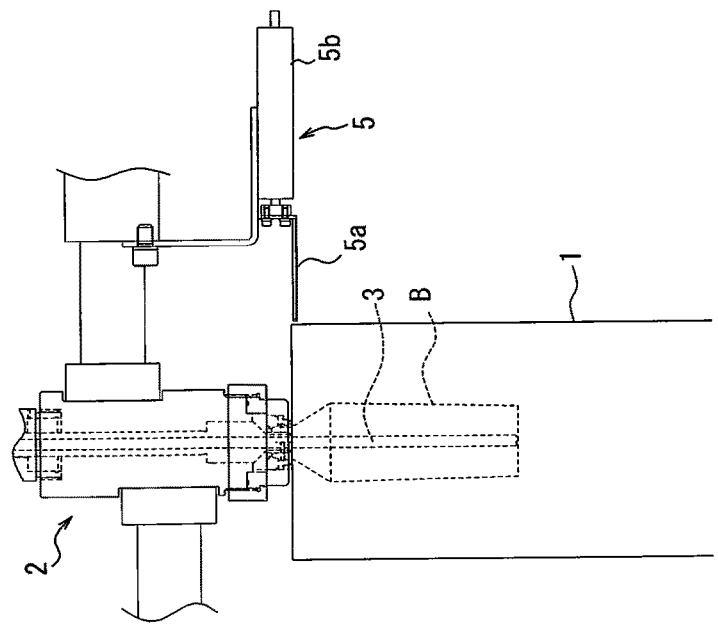

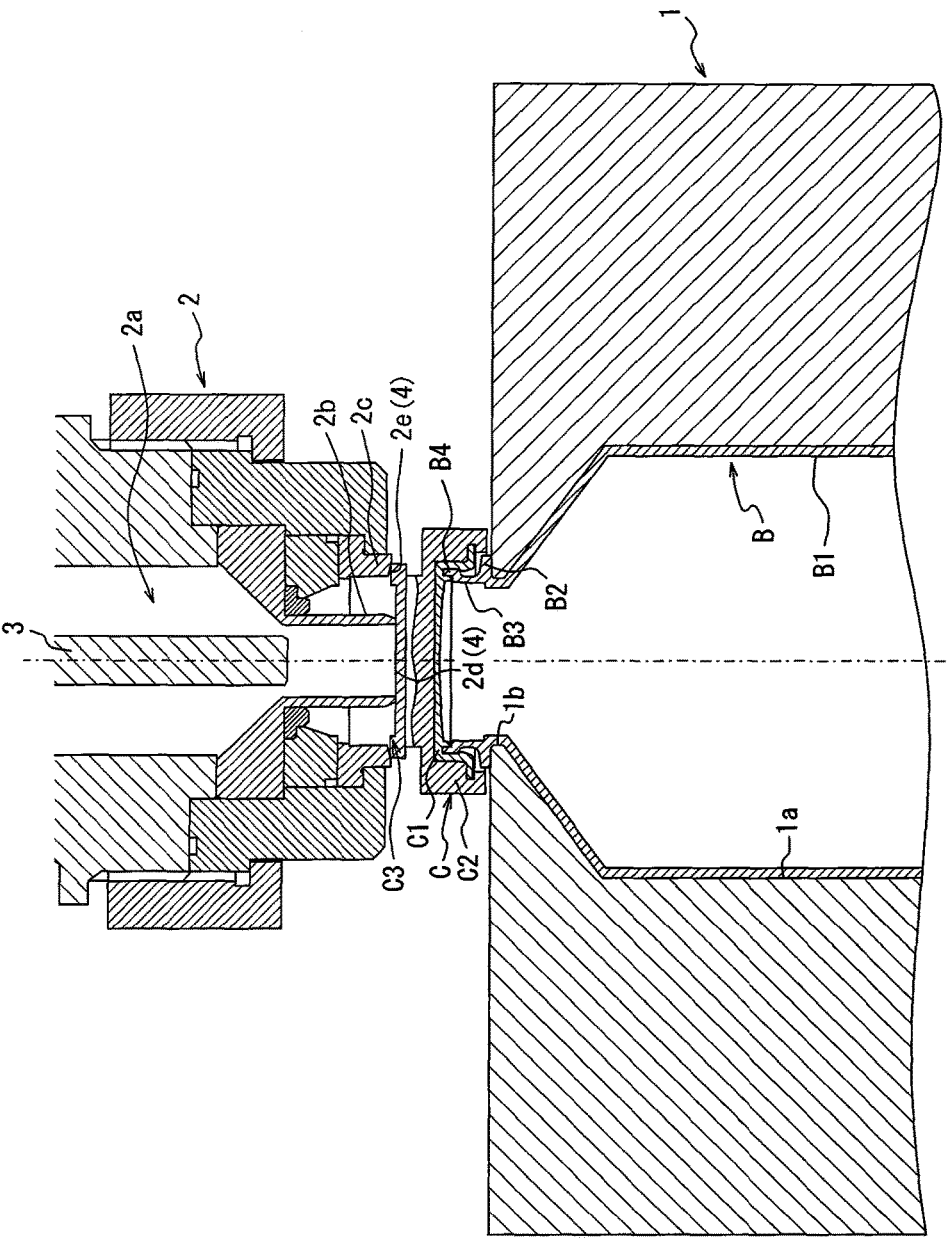

BLOW MOLDING DEVICE

TECHNICAL FIELD

This disclosure relates to a blow molding device for forming a bottle by blow molding bottomed cylindrical preform and, in particular, relates to using a liquid as a pressurized fluid for blow molding.

BACKGROUND

Resin bottles, representative examples of which are oriented polypropylene (OPP) bottles and polyethylene naphthalate (PET) bottles, are used for a variety of purposes, from beverages to food products and cosmetics. Such bottles are generally formed by using a blow molding device to perform two-axis stretching blow molding on resin preform that has been formed in a bottomed cylindrical shape by injection molding or the like.

A known blow molding device uses pressurized liquid instead of pressurized air as the pressurized fluid with which the preform is formed. In this case, if the content liquid that is ultimately filled into the product, such as a drink, cosmetic, medicine, or the like, is used as the liquid, then this approach allows the step of filling the content liquid into the bottle to be omitted and thus simplifies the production process.

When removing the bottle filled with content liquid from the mold of the blow molding device and transferring the bottle to the downstream process, the content liquid may spill from the bottle due to the effect of vibration, a change in velocity, or the like when the bottle is displaced, causing problems such as insufficient content liquid in the bottle or soiling of the bottle.

As a technique for resolving these problems, for example JP 2011-527244 A discloses a device that includes ducts 140, 145 and spouts 148, 149 for injecting liquid into a preform 110, a mold 100 having formed therein a cavity that molds the preform 110 into a predetermined bottle shape by injection of the liquid, a stretching rod 130 that stretches the preform 110, and a stoppering device that fixes and holds the cap against the bottle that has the liquid injected therein.

With the device in JP 2011-527244 A, however, it is necessary to remove the stoppering device 240 and position the stretching rod 130 directly above the preform 110 when molding the bottle, and to remove the stretching rod 130 and position the stoppering device 240 directly above the bottle when attaching the cap to the bottle. In other words, so that the stretching rod 130 and the stoppering device 240 do not interfere with each other, both need to be displaceable with respect to the mold, which complicates the structure of the device and leads to an increase in size of the device.

Therefore, as a device that blow molds preform using a liquid, it would be helpful to provide a new blow molding device that, while having a function to seal a bottle with a cap, has a simpler structure than a conventional device that includes a stoppering device.

SUMMARY

A blow molding device according to this disclosure is provided with a mold for blow molding a bottomed cylindrical preform mounted in the mold and a blow nozzle that connects to a mouth tube section of the preform mounted in the mold, the blow molding device molds a bottle by feeding pressurized liquid from the blow nozzle into the preform to cause the preform to expand in a shape along a cavity of the mold, the blow molding device comprising:

a blow nozzle displacement unit configured to raise and lower the blow nozzle along an axis of the preform;

wherein the blow nozzle has a cap attaching unit configured to fix and hold a cap for sealing the bottle to a mouth tube section of the bottle when the blow nozzle is lowered by operation of the blow nozzle displacement unit.

The cap attaching unit is preferably a tip of the blow nozzle that abuts an upper surface of the cap and pushes the cap onto the mouth tube section of the bottle.

The cap preferably has a recess that opens upwards, and the tip of the blow nozzle preferably has a protrusion that fits into the recess and positions the cap.

The cap attaching unit is preferably a rotating portion of the blow nozzle that is provided rotatably about a central axis of the blow nozzle and is configured to screw the cap onto the mouth tube section of the bottle.

In this disclosure, a cap attaching unit is provided on the blow nozzle, and by lowering the blow nozzle, a cap is fixed and held to the mouth tube section of the bottle. Therefore, the only component that is displaced with respect to the mold is the blow nozzle. The device structure can thus be simplified as compared to that of a conventional device.

When the cap attaching unit is the tip of the blow nozzle that abuts the upper surface of the cap and pushes the cap onto the mouth tube section of the bottle, the cap that engages with the undercut provided in the mouth tube section of the bottle can be fixed and held against the bottle. When the cap has a recess that opens upwards, and the tip of the blow nozzle has a protrusion that fits into the recess and positions the cap, then misalignment between the blow nozzle and the cap can be prevented when lowering the blow nozzle, thereby fixing and holding the cap against the bottle more reliably.

When the cap attaching unit is a rotating portion of the blow nozzle that is provided rotatably about the central axis of the blow nozzle and is configured to screw the cap onto the mouth tube section of the bottle, then the cap that engages with a threaded portion provided on the mouth tube section of the bottle can be fixed and held against the bottle.

BRIEF DESCRIPTION OF THE DRAWINGS

In the accompanying drawings:

FIGS. 3(a) and 3(b) illustrate processes subsequent to the state illustrated in FIG. 1(b), with FIG. 3(a) illustrating pressurized liquid being fed into the preform while a stretching rod is lowered, and FIG. 3(b) illustrating the blow nozzle being raised, a cap being supplied, and a tray being moved forward after FIG. 3(a);

FIG. 5 is a cross-sectional diagram illustrating an enlargement of the area around the blow nozzle in FIG. 4(a)

DETAILED DESCRIPTION

Figure 1A:
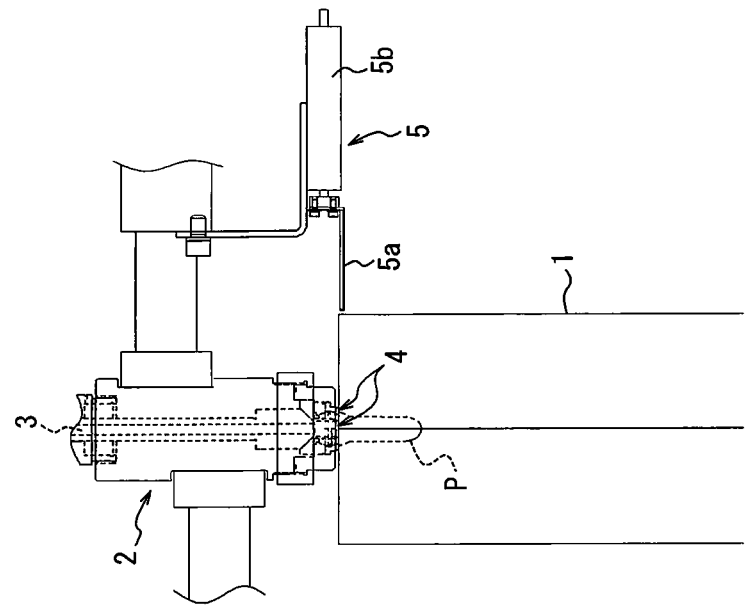
FIGS. 1(a) and 1(b) illustrate a blow molding device according to this disclosure, with FIG. 1(a) illustrating the preform being mounted in the mold, and FIG. 1(b) illustrating the blow nozzle having been lowered after FIG. 1(a)
Figure 1B:
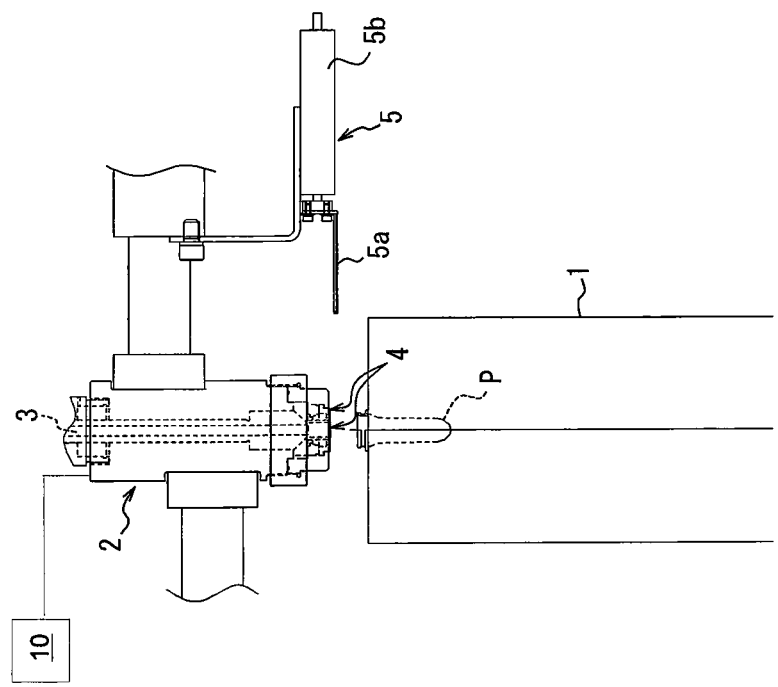
Figure 2:
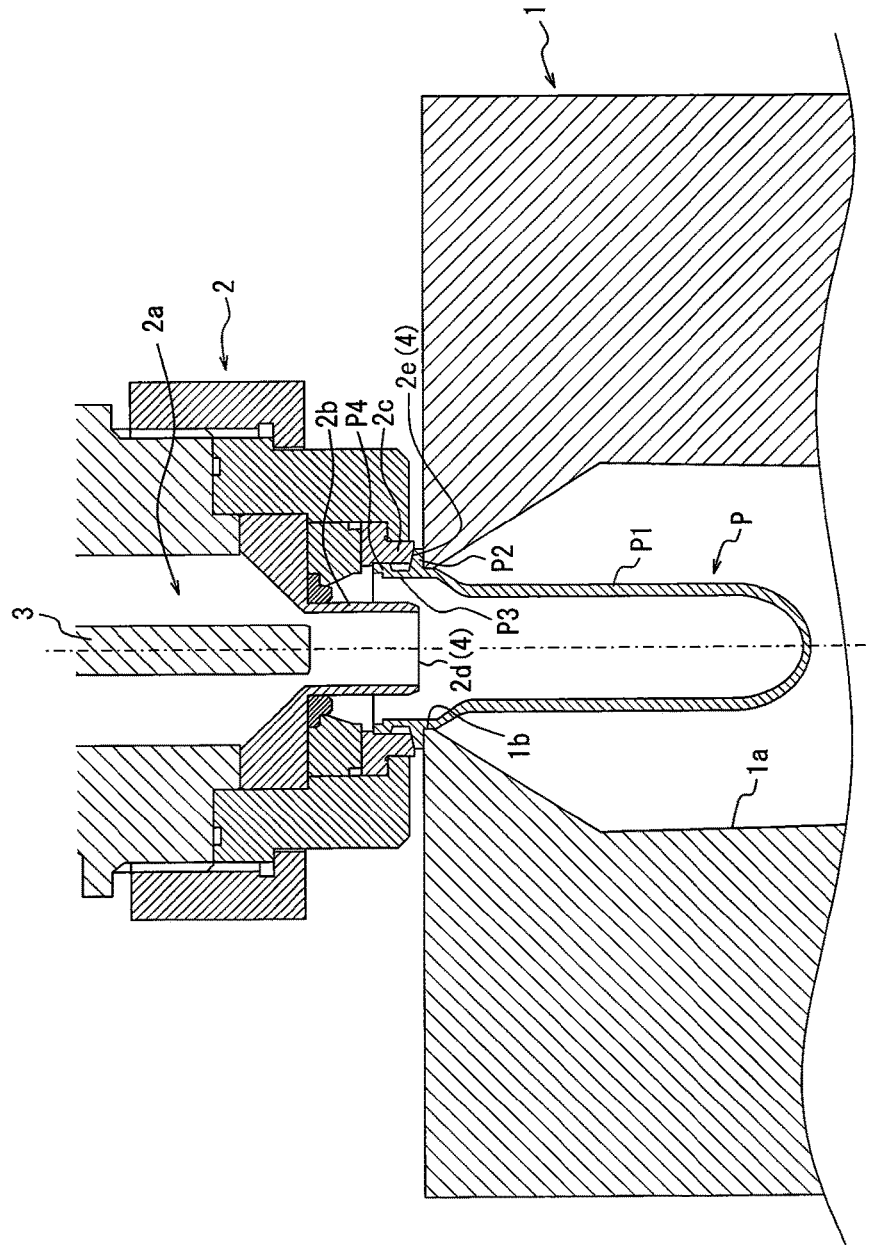
FIG. 2 is a cross-sectional diagram illustrating an enlargement of the area around the blow nozzle in FIG. 1(b)

The following describes an embodiment of a blow molding device according to this disclosure with reference to FIG. 1(b) and FIG. 2. The blow molding device according to this embodiment includes a mold 1, a blow nozzle 2, a stretching rod 3, a cap attaching unit 4, and a liquid receiving unit 5.

The mold 1 illustrated in FIG. 2 is provided with a cavity 1(a) in the shape of a bottle and a circular opening 1(b) that is connected to the cavity 1(a) and that opens to the upper surface of the mold 1. The mold 1 is configured to open into left and right portions divided by the center axis of the opening 1(b). By opening the mold 1, the molded bottle can be removed from the mold 1.

Preform P can be mounted through the opening 1(b). The illustrated preform P is formed into a bottomed cylindrical shape by injection molding or the like using resin material such as polypropylene (PP) or polyethylene naphthalate (PET). At the upper edge of a body P1 in the shape of a test tube that broadens at the top, a neck ring P2 that extends radially outward and a cylindrical mouth tube section P3 are integrally connected. An undercut P4 that yields a form protruding radially outward is provided at the top of the mouth tube section P3. When the preform P is mounted in the mold 1, the central axis of the preform P matches the central axis of the opening 1(b).

The blow nozzle 2 is provided with a passage 2a that extends vertically inside the blow nozzle 2. The passage 2a is connected to a non-illustrated pressurized liquid feeder and can feed pressurized liquid. A cylindrical spout 2b provided coaxially with the central axis of the opening 1(b) is provided at the exit of the passage 2a, and pressurized liquid can pass through this spout 2b and be fed to the preform P. Radially outward from the spout 2b, a cylindrical sealing portion 2c that abuts the upper surface and outer circumferential surface of the mouth tube section P3 of the preform P and that has a tip abutting the upper surface of the neck ring P2 is provided. The sealing portion 2c is also provided coaxially with the central axis of the opening 1(b).

The blow nozzle 2 can be raised and lowered along the central axis of the opening 1(b) by a blow nozzle displacement unit 10, which is illustrated in connection with FIG. 1A. For example, a combination of a linear guide with a slider provided along a straight trajectory that extends vertically and a ball screw that converts rotational motion of a motor into linear motion may be used as the blow nozzle displacement unit, but any of a variety of other mechanisms may also be used.

The stretching rod 3 is a vertically extending cylinder and is provided in the passage 2a. The stretching rod 3 is configured to be able to rise or lower relative to the blow nozzle 2.

The cap attaching unit 4 fixes and holds a cap C against a mouth tube section B3 of the bottle B obtained by blow molding the preform P, as illustrated in FIG. 5. The cap C in this embodiment is formed by a cap body C1 and an adapter C2 mounted onto the outside of the cap body C1. The cap body C1 has a form that is a topped cylindrical shape with a flange at the bottom edge, and the cap body C1 seals the bottle B by engaging with an undercut B4 of the mouth tube section B3. The adapter C2 has a groove fitting onto the flange of the cap body C1 and is provided with a recess C3, on the top surface thereof, that opens upward. The cap attaching unit 4 of this embodiment is the tip of the blow nozzle 2 that abuts the upper surface of the adapter C2 and pushes the cap C onto the mouth tube section B3 when the blow nozzle 2 is lowered by operation of the blow nozzle displacement unit. Specifically, the cap attaching unit 4 is the tip 2d of the spout 2b and the tip 2e of the sealing portion 2c. It is also possible for only one of the tip 2d of the spout 2b and the tip 2e of the sealing portion 2c to press against the cap C, or for a portion at a different position of the bottom of the blow nozzle 2 to press against the cap C.

The liquid receiving unit 5 is disposed to the side of the blow nozzle 2, as illustrated in FIG. 1(b), and is provided for receiving any liquid that drips from the spout 2b. The liquid receiving unit 5 is configured by a tray 5a that is formed by an L-shaped plate in the illustrated example and a tray displacement unit 5b capable of moving the tray 5a forward to a position directly below the spout 2b. The tray displacement unit 5b in this embodiment is a guided cylinder, but this example is not limiting.

While omitted from the drawings, the blow molding device of this embodiment is also provided with a preform feeding unit that feeds the preform P to the mold 1, a cap feeding unit that feeds the cap C to the mouth tube section B3 of the bottle B, and a bottle transfer unit that removes the molded bottle B from the mold 1 and transfers the bottle B to the downstream process. For example, a guided cylinder provided with a holder that holds the preform, cap, and bottle may be used as the preform feeding unit, cap feeding unit, and bottle transfer unit, but any of a variety of other mechanisms may also be used. The operator may also feed and remove parts without using the preform feeding unit, cap feeding unit, and bottle transfer unit.

To perform blow molding using the blow molding device structured in this way, the preform P is first fed to the open mold 1 with the preform feeding unit, and the mold 1 is then closed, as illustrated in FIG. 1(a). Then, as illustrated in FIG. 1(b), the blow nozzle 2 is lowered by operation of the blow nozzle displacement unit. As a result, as illustrated in FIG. 2, the spout 2b enters inside the mouth tube section P3, the sealing portion 2c abuts against the upper surface and the outer circumferential surface of the mouth tube section P3, and the tip 2e of the sealing portion 2c abuts against the upper surface of the neck ring P2.

As illustrated in FIG. 3(a), the stretching rod 3 is lowered, and the pressurized liquid is fed into the preform P from the spout 2b to expand the preform P and mold the bottle B. Subsequently, the stretching rod 3 is raised and feeding of the liquid is stopped, and as illustrated in FIG. 3(b), the blow nozzle 2 is raised and the cap C is fed to the mouth tube section B3 of the bottle B by the cap feeding unit. Furthermore, in this embodiment, the tray displacement unit 5b is operated to move the tray 5a forward to a position directly below the spout 2b. As a result, even if liquid drips from the spout 2b, liquid does not spill onto the cap C or the mold 1.

Figure 4A:
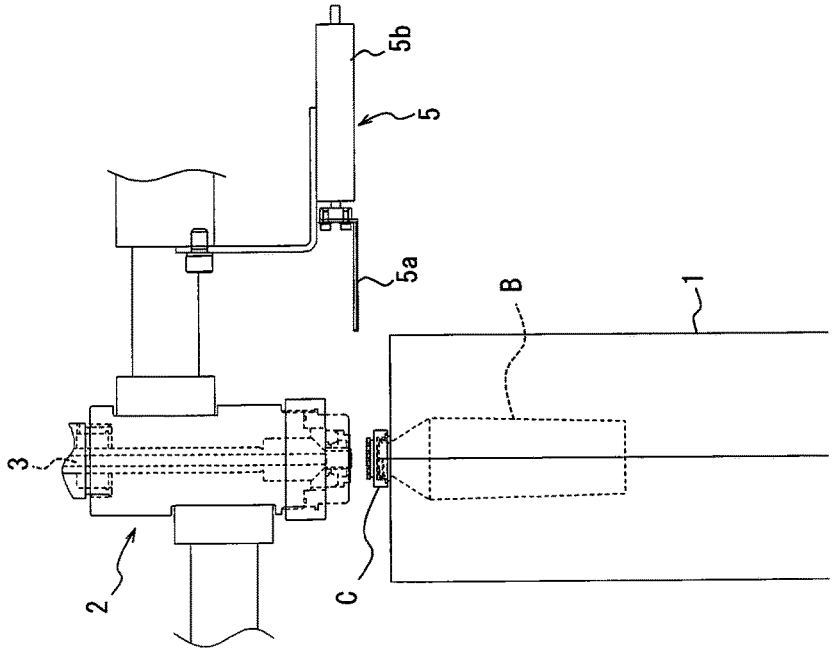
FIGS. 4(a) and 4(b) illustrate processes subsequent to FIG. 3(b), with FIG. 4(a) illustrating the tray being withdrawn, the blow nozzle lowered, and the cap being pushed onto the mouth tube section of the bottle, and FIG. 4(b) illustrating the blow nozzle being raised after FIG. 4(a)
Figure 4B:
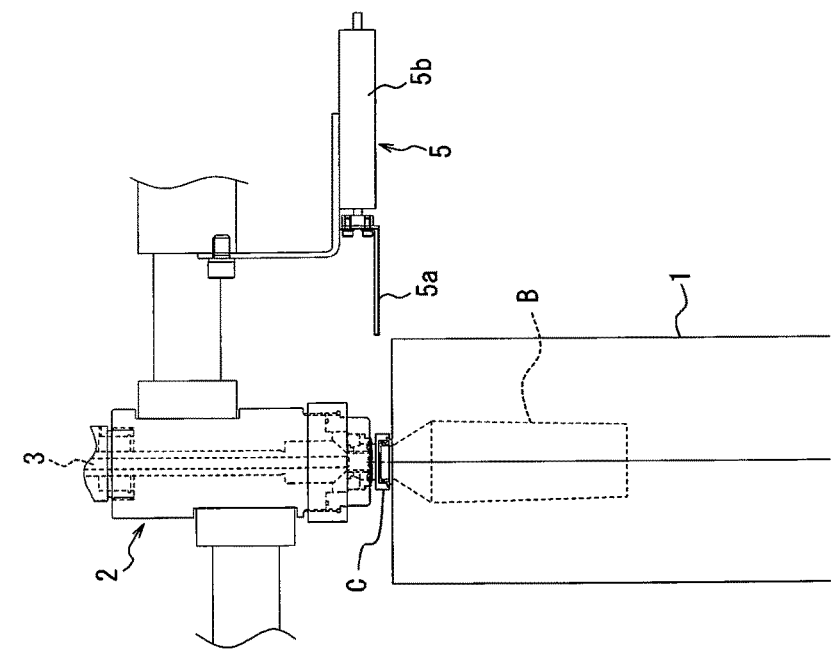

Subsequently, as illustrated in FIG. 4(a), the tray 5a is withdrawn, and the blow nozzle 2 is lowered. As a result, as illustrated in FIG. 5, the tip 2d of the spout 2b and the tip 2e of the sealing portion 2c abut the upper surface of the adapter C2, the cap C is pushed onto the mouth tube section B3, and the cap body C1 engages with the undercut B4. Thereafter, the blow nozzle 2 is raised as illustrated in FIG. 4(b), and the mold 1 is opened. The bottle B is then transferred by the bottle transfer unit. Since the bottle B is sealed by the cap body C1, the liquid that fills the bottle B does not spill.

Subsequently, the adapter C2 is removed from the bottle B and can be reused by being mounted on a new cap body C1. By using the adapter C2 as in this embodiment, problems such as the cap body C1 breaking or soiling can be prevented.

Also, the adapter C2 can be used as a gripper during transfer. Hence, the cap body C1 need not be provided with the function of a gripper, which offers the advantage of increasing the degree of freedom in designing the cap body C1.

The blow molding device according to this embodiment has been illustrated with an example in which the mold 1 and the blow nozzle 2 form one pair (a one-batch type), but a plurality of pairs are preferably provided. As a result, while blow molding is being performed with one mold 1, the cap C can be attached at another mold 1 that has finished blow molding, thereby shortening the cycle time.

Figure 6:
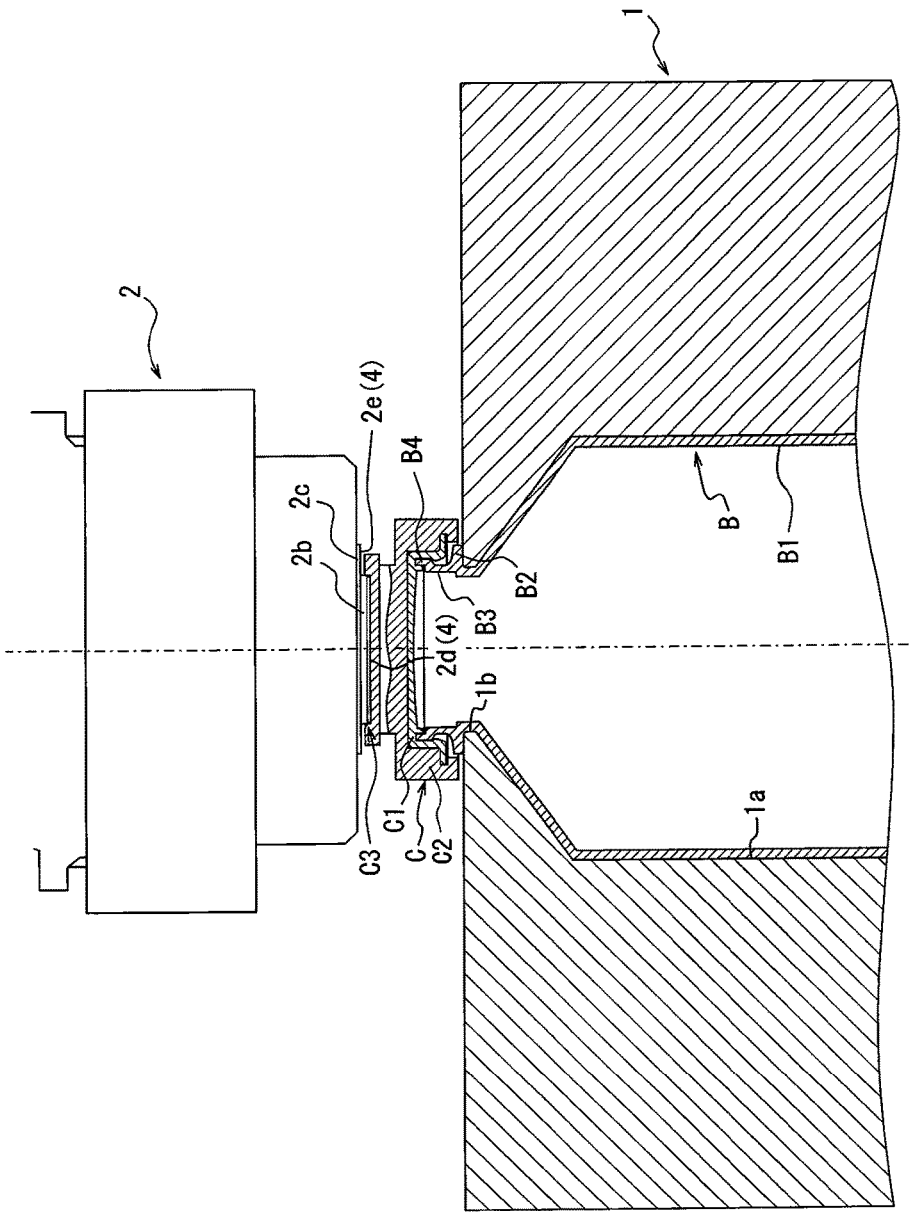
FIG. 6 is an illustration, similar to FIG. 5, of another embodiment of a blow nozzle.

This disclosure is not limited to this embodiment, and a variety of modifications may be made within the scope of the patent claims. For example, as illustrated in FIG. 6, by setting the outer diameter of the spout 2b to be approximately the same as the inner diameter of the recess C3 and having the tip 2d fit into the recess C3, misalignment between the blow nozzle 2 and the cap C can be prevented when lowering the blow nozzle 2, thereby fixing and holding the cap C against the bottle B more reliably.

The cap body C1 may be pushed by the blow nozzle 2 directly without use of the adapter C2. Also, when fixing and holding the cap C to the mouth tube section B3, the tray 5a may be left in place after being moved forward, and the cap C may be pushed by the blow nozzle 2 via the tray 5a. The liquid receiving unit 5 is not essential to the blow molding process and need not be used. Furthermore, the bottle B may be molded with pressurized liquid alone, without using the stretching rod 3.

While omitted from the drawings, when using a cap that engages with a threaded portion provided on the mouth tube section of the bottle, a rotating portion may be provided on the blow nozzle 2 to be rotatable about the central axis of the blow nozzle 2 (the central axis of the spout 2b), and the cap may be fixed and held against the bottle by rotating the cap with this rotating portion.

According to this disclosure, a blow nozzle can be used to fix and hold a cap to a bottle, thus making it possible to provide a new blow molding device that has a simpler structure than that of a conventional device including a stoppering device and that reduces the size and cost of the device.

The invention claimed is:

1. A blow molding device provided with a mold for blow molding a bottomed cylindrical preform mounted in the mold by feeding pressurized liquid into the preform to cause the preform to expand into a shape of a cavity of the mold, the preform including a mouth tube section, the blow molding device comprising:
   a blow nozzle having a tip portion configured to engage the mouth tube section of the preform mounted in the mold;
   a blow nozzle displacement unit configured to raise and lower the blow nozzle along an axis of the preform; and
   the blow nozzle further including a cap attaching unit configured to fixedly engage and seal a cap to the mouth tube section of the bottle during lowering of the blow nozzle by the blow nozzle displacement unit.

2. The blow molding device of claim 1, wherein the cap attaching unit is the tip portion of the blow nozzle, the tip portion being configured to abut an upper surface of the cap and push the cap onto the mouth tube section of the bottle.

3. The blow molding device of claim 2, wherein the cap has a recess that opens upwards, and the tip of the blow nozzle has a protrusion that fits into the recess and positions the cap.

4. The blow molding device of claim 1, wherein the cap attaching unit is a rotating portion of the blow nozzle that is provided rotatably about a central axis of the blow nozzle and is configured to screw the cap onto the mouth tube section of the bottle.

5. The blow molding device of claim 1, further comprising a liquid receiving unit, the liquid receiving unit being transversely moveable relative to the blow nozzle and moveable between a first position and a second position.

6. The blow molding device of claim 5, wherein the second position is located axially between the tip portion of the blow nozzle and the mold, and the first position is located laterally relative to the second position.

7. The blow molding device of claim 5, wherein the liquid receiving unit is a tray configured to receive and retain liquid therein.

8. The blow molding device of claim 5, wherein the liquid receiving unit is the cap attaching unit.

9. The blow molding device of claim 5, wherein the liquid receiving unit is coupled to the blow nozzle displacement unit and configured to be raised and lowered with the blow nozzle by the blow nozzle displacement unit.

10. The blow molding device of claim 5, wherein the liquid receiving unit is coupled to a tray displacement unit, the tray displacement unit being configured to move the liquid receiving unit between the first and second positions.

11. A blow molding device provided with a mold for blow molding a bottomed cylindrical preform mounted in the mold by feeding pressurized liquid into the preform to cause the preform to expand into a shape of a cavity of the mold, the preform including a mouth tube section, the blow molding device comprising:
   a blow nozzle having a tip portion configured to engage the mouth tube section of the preform mounted in the mold;
   a blow nozzle displacement unit coupled to the blow nozzle wherein the blow nozzle is moveable along an axis of the preform between a raised position and lowered positon, in the lowered position the tip portion of the blow nozzle engaging the mouth tube section of the preform; and
   the blow nozzle further including a cap attaching unit configured to fixedly engage a cap for sealing the bottle to the mouth tube section of the bottle during lowering of the blow nozzle by the blow nozzle displacement unit, the cap attaching unit including the tip portion of the blow nozzle, the tip portion of the blow nozzle having a protrusion that fits into a recess of the cap that opens upwards.

* * * * *